(12) United States Patent
Li et al.

(10) Patent No.: US 8,746,493 B2
(45) Date of Patent: Jun. 10, 2014

(54) TANK CONTAINER, TANK BODY AND PROCESSING METHOD OF TANK BODY

(75) Inventors: Guang Li, Heilongjian (CN); Yuebin Yu, Heilongjiang (CN); Zhongbo Li, Heilongjian (CN); Zhen Zhu, Heilongjiang (CN); Qipeng Yang, Heilongjiang (CN); Enqiang Lei, Heilongjiang (CN); Jungsong Wang, Heilongjiang (CN); Zhigang Li, Heilongjiang (CN); Lianhua Lou, Heilongjiang (CN); Jian Zhao, Heilongjiang (CN); Yongfeng Yi, Heilongjiang (CN)

(73) Assignees: Qiqihar Railway Rolling Stock Co., Ltd., Heilongjiang (CN); Dalian Qiche Railway Rolling Stock Co., Ltd., Liaoning (CN)

( * ) Notice: Subject to any disclaimer, the term of this patent is extended or adjusted under 35 U.S.C. 154(b) by 137 days.

(21) Appl. No.: 13/260,892

(22) PCT Filed: May 19, 2010

(86) PCT No.: PCT/CN2010/072921
§ 371 (c)(1),
(2), (4) Date: Sep. 28, 2011

(87) PCT Pub. No.: WO2010/135961
PCT Pub. Date: Dec. 2, 2010

(65) Prior Publication Data
US 2012/0018436 A1   Jan. 26, 2012

(30) Foreign Application Priority Data
May 27, 2009  (CN) .......................... 2009 1 0143635

(51) Int. Cl.
*F17C 1/00*  (2006.01)
*B65D 6/00*  (2006.01)
*B65D 1/42*  (2006.01)

(52) U.S. Cl.
USPC .......................... 220/584; 220/4.12; 220/646

(58) Field of Classification Search
USPC .............. 220/584, 4.12, 4.26, 4.27, 646, 647, 220/648, 649, 651–654, 562–565; 280/837, 280/838
See application file for complete search history.

(56) References Cited

U.S. PATENT DOCUMENTS

| 4,307,812 | A | * | 12/1981 | Gerhard | 220/1.5 |
| 4,728,000 | A | * | 3/1988 | Gerhard | 220/647 |
| 4,899,901 | A | * | 2/1990 | Nickel | 220/647 |
| 4,923,075 | A | * | 5/1990 | Rohl et al. | 165/169 |
| 6,155,450 | A | * | 12/2000 | Vasiliev et al. | 220/589 |
| 7,222,744 | B2 | | 5/2007 | Magyar | |
| 8,042,767 | B2 | * | 10/2011 | Velicki et al. | 244/117 R |

FOREIGN PATENT DOCUMENTS

| CN | 2590955 Y | 12/2003 |
| CN | 2711092 Y | 7/2005 |
| CN | 2790965 Y | 6/2006 |
| CN | 2892731 Y | 4/2007 |
| CN | 2895306 Y | 5/2007 |
| CN | 201092436 Y | 7/2008 |
| CN | 101554948 A | 10/2009 |
| EP | 0325721 | 8/1989 |
| EP | 1 365 832 A1 | 11/2003 |

OTHER PUBLICATIONS

Canadian Office Action for Application No. 2,757,203, dated Oct. 4, 2013, 3 pages.

* cited by examiner

*Primary Examiner* — Bryon Gehman
*Assistant Examiner* — Shawn M Braden
(74) *Attorney, Agent, or Firm* — Patterson Thuente Pedersen, P.A.

(57) ABSTRACT

A container tank body and a processing method thereof are provided. The tank body is arranged in a frame with a square-shaped cross section and comprises a cylindrical main body part, end enclosures arranged at two ends of the cylindrical main body part and fixedly connected with the cylindrical main body part, and a tank body strengthening device. The cylindrical main body part comprises a plurality of parts with an arc-shaped cross section, the parts are formed by bending and welding a same panel, and the cross section of the cylindrical main body part of the tank body is generally arranged between the square-shaped cross section of the frame and an inscribed circle of the square-shaped cross section. A tank container comprising the tank body is also disclosed. As the cylindrical main body part is made by continuously bending a whole panel, the molding process is simplified so that the cylindrical main body part is only provided with one welding line, thereby remarkably lowering the leakage risk of the container tank body in use and improving the reliability of the container tank body in work; and the structure has quite strong self-anti-load capacity, thereby decreasing the number of the used tank strengthening devices and reducing the deadweight.

7 Claims, 5 Drawing Sheets

TANK CONTAINER, TANK BODY AND PROCESSING METHOD OF TANK BODY

This application is the national phase of International Application No. PCT/CN2010/072921, titled "TANK CONTAINER, TANK BODY AND PROCESSING METHOD OF TANK BODY", filed on May 19, 2010, which claims the priority of Chinese Patent Application No. 200910143635.6, entitled "TANK CONTAINER, TANK BODY AND PROCESSING METHOD OF TANK BODY", filed with the Chinese Patent Office on May 27, 2009, which is incorporated herein by reference in its entirety.

FIELD OF THE INVENTION

The present invention relates to the field of logistics machinery, and in particular to a tank body of a container. The present invention further relates to a tank container including the above tank body and a method for manufacturing the tank body.

BACKGROUND OF THE INVENTION

With the rapid development of Chinese economy and construction as well as the initial formation of the economic globalization pattern, the logistics industry has been developed rapidly, and the requirement for container becomes greater increasingly. The tank container is one type of containers, and is widely used for containing and conveying various goods in liquid state, gaseous state and granular-powder solid state.

The tank container mainly consists of a frame and a tank body disposed inside the frame. The tank body includes a receptacle for holding goods, a pipe line and attaching pieces provided for preventing the goods from flowing. The frame generally includes a bottom frame, an end frame and force bearing elements, and is used for carrying various dynamic and static loads generated in the use of the container. The volume of the tank body is one of the important parameters which determine the load-carrying capacity of the tank container; and the reliability of the welding portion of the tank body provides an important guarantee for the safe use of the tank container.

For a long period of time, the tank container mainly adopts an elongate cylindrical tank body with a cross section thereof being processed to be circular, in which a end enclosure is usually a standard end enclosure in accordance with the Chinese Standard. The tank body of the container has been widely used due to relatively good force-bearing effect and relatively strong load-carrying ability resulting from its circular cross section. However, with the limitation of the external frame, there is a maximum threshold in the diameter of the circular cross section, that is, there is a maximum threshold in the volume, so that the load-carrying ability of the container can not be utilized completely. Thus, it is impossible that the volume of this elongate cylindrical tank body is further increased.

At present, to solve the above problem, the volume of the tank container is mainly increased by assembling and welding a plurality of steel plates and beam pieces into a non-circular tank body. By this way, the boundary of the frame of the container may be relatively effectively used. However, since this structure has relatively low load-carrying ability, reinforcement measures, e.g., providing a plurality of ribs inside the tank body, have to be taken to resist against the internal and external pressure imparted on the tank body in working, so as to improve the load-carrying ability of the structure. As a result, the dead weight of the tank body is increased, and the carrying capacity of the tank container is restrained. Furthermore, there are many welding seams on the tank body, and some problems such as leakage are prone to occur at the welding seam in use, resulting in that the reliability of the working of the tank container is decreased.

In a word, it has become a problem to be solved by those skilled in the art to reduce the dead weight of the tank body and to increase the load-carrying ability and the reliability of the tank body in the case of ensuring the relatively large volume of the container tank.

SUMMARY OF THE INVENTION

An object of the present invention is to provide a tank body of a container, which can reduce dead weight and improve the load-carrying ability and reliability with ensuring its relatively big volume. Another object of the present invention is to provide a tank container including the above tank body and a method for manufacturing the tank body.

To solve the above technical problems, the present invention provides a method for manufacturing a tank body of a tank container, with the tank body being arranged inside a frame with a square cross section, and a cross section of a cylindrical main body part of the tank body being located substantially between the square cross section of the frame and an inscribed circle of the square cross section. The method includes the following steps:

1) Providing sheet material: providing an integral piece of square sheet material which has a first side edge and a second side edge opposite to the first side edge; and dividing the square sheet material into a plurality of strip-shaped sheets along a plurality of axes in parallel with the first side edge;
2) Bending: bending the strip-shaped sheets respectively, so that a cross section of each of the strip-shaped sheets perpendicular to respective axis is of an arc shape, folding the square sheet material along the axes of the strip-shaped sheets, and connecting the first side edge and the second side edge;
3) Welding: welding the first side edge and the second side edge into an integral piece to form the cylindrical main body part; and
4) Connecting with end enclosures: welding end enclosures at both ends of the cylindrical main body part, respectively.

The present invention further provides a tank body of a container arranged inside a frame with a square cross section, and including: a cylindrical main body part; end enclosures arranged at both ends of the cylindrical main body part and fixedly connected with the cylindrical main body part; and a tank body strengthening device. The cylindrical main body part includes a plurality of parts having an arc-shaped cross section, and is formed by bending, folding and welding one piece of square sheet material; and a cross section of the cylindrical main body part of the tank body is located substantially between the square cross section of the frame and an inscribed circle of the square cross section.

Preferably, the cross section of the cylindrical main body part includes four first arcs having relatively large diameter, and four second arcs having relatively small diameter and arranged alternately with the first arcs.

Preferably, the strengthening device is a strengthening ring fitted and fixed with the cylindrical main body part.

Preferably, the number of the strengthening ring is more than one, and each of the strengthening rings is arranged inside the cylindrical main body part.

Preferably, a cross section of the strengthening ring is of a "I" shape substantially, and the strengthening ring includes an external ring, a middle part and an internal ring. The external ring is cylindrical in coaxial with the cylindrical main body part, and is fixedly connected with the cylindrical main body part; the middle part is an annular strengthening plate perpendicular to the external ring; and the internal ring is an internal strengthening member having a circular cross section or a ring-shaped cross section and being fixedly connected to the inner side of the annular strengthening plate.

Preferably, each of the end enclosures further includes a connecting plate and a projection part. The connecting plate is adapted to the cross section of the cylindrical main body part in shape, and the projection part is located in the middle of the connecting plate.

The present invention further provides a tank container including any of the above tank bodies of the container.

In the method for manufacturing the tank body of the container according to the present invention, the integral piece of square sheet material is bended, so that the sheet material has an arc-shaped cross section; and the first side edge and the second edge which are opposed to each other are weld to form a cylindrical main body part, that is, only one welding procedure is required to form the cylindrical main body part, so that the risk of leakage in use is reduced, and the reliability of the tank body of the container in working is improved. Moreover, since the integral piece of square sheet material is bended into an arc shape, the load-carrying ability of the cylindrical main body part itself is improved, so that the number of the strengthening member required may be reduced, thereby the dead weight of the tank body of the container is reduced and the load-carrying ability of the tank body of the container is effectively improved.

In the tank body of the container according to the present invention, the cylindrical main body part is formed by bending one piece of sheet material into a plurality of arc-shaped surfaces and by one-time welding. The cross section of the cylindrical main body part is formed by smoothly connecting the plurality of arcs, and is formed between the square cross section of the external frame of the tank body of the container and the inscribed circle of the square cross section. Since the cylindrical main body part is formed by continuously bending an integral piece of sheet material and then by welding in only one procedure, so that the cylindrical main body part has only one welding seam, the risk of leakage of the tank body of the container in use is reduced significantly, and the reliability of the tank body of the container in working is improved. Furthermore, the cylindrical main body part is formed by smoothly connecting a plurality of arc-shaped surfaces, so that the boundary of the external frame is fully utilized, and the volume of the tank body is ensured. Moreover, compared with the cross section formed by assembling several steel plates, the force condition of the arc-shaped cross section is better substantially, and the load-carrying ability of the cylindrical main body part itself is improved, so that the number of the strengthening member required may be reduced, thereby the dead weight of the tank body of the container is reduced and the load-carrying ability of the tank body of the container is effectively improved.

In one specific embodiment, the cross section of the cylindrical main body part includes eight arcs. Among the arcs, four first arcs have the same larger diameter, and four second arcs have the same smaller diameter; and the first arcs and the second arcs are arranged alternately with each other, so as to connect smoothly the eight arcs. The arc-shaped cross section has a better force-bearing ability, so that the load-carrying ability of the tank body of the container itself is further improved. Thus, the number of the tank body strengthening members required may be further reduced, and the dead weight of the tank body of the container is further reduced.

In another specific embodiment, the tank body strengthening device may be specifically a strengthening ring. The strengthening ring is fitted and fixedly connected with the cylindrical main body part. By using the tank body strengthening device in the ring shape, the strength of the tank body is further improved, and moreover, to obtain the same strength, the ring-shaped tank body strengthening device requires less material, so that the dead weight of the tank body is further reduced.

In yet another specific embodiment, the strengthening ring may be specifically an internal strengthening ring arranged inside the cylindrical main body part, in which the internal ring is an internal strengthening member with a circular cross section, the middle part is an annular strengthening plate having a certain thickness, and the external ring is a cylindrical strengthening ring. This structure may bear heavier loads, and requires less material and space, so that the tank body of the container may better resist against the internal and external pressure and take up relatively small space. Thus, the effective volume of the tank body is ensured and the dead weight of the tank body of the container is further reduced.

DETAILED DESCRIPTION

An object of the present invention is to provide a tank body of a container, which can reduce its dead weight and improve its load-carrying ability and reliability without reducing its volume. Another object of the present invention is to provide a tank container including the above tank body and a method for manufacturing the tank body.

To make the solutions of the present invention better to be understood by those skilled in the art, further detailed descriptions will be made to the present invention in conjunction with the drawings and the specific embodiments.

Figure 1:
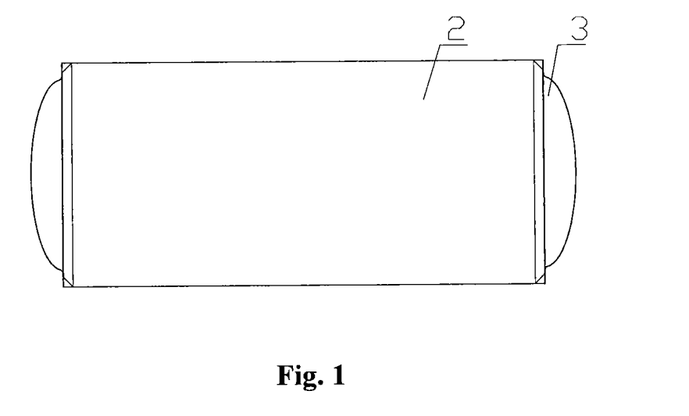
FIG. 1 is a structural schematic view of a specific embodiment of a tank body of a container according to the present invention.
Figure 2:
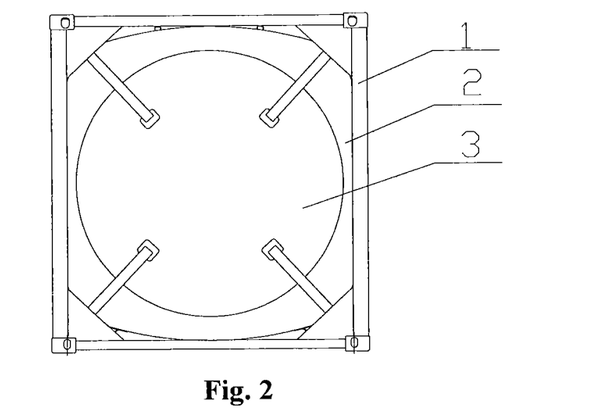
FIG. 2 is a structural schematic side view of the tank body of the container shown in FIG. 1.

Referring to FIGS. 1 and 2, FIG. 1 is a structural schematic view of a specific embodiment of a tank body of a container according to the present invention; and FIG. 2 is a structural schematic side view of the tank body of the container shown in FIG. 1.

In one specific embodiment, the tank body of the container according to the present invention (not shown) is located inside a frame 1 which is square in cross section. The tank body of the container includes a cylindrical main body part 2, end enclosures 3 provided at both ends of the cylindrical main body part 2 and connected to the cylindrical main body part 2 fixedly, and a tank body strengthening device 4. The above cylindrical main body part 2 includes a plurality of arc-shaped surfaces and is formed by bending and welding one piece of sheet material (or panel), and a cross section of the cylindrical main body part 2 is located approximately between the square cross section of the frame 1 and an inscribed circle of the square cross section, i.e. within the area indicated by the hatchings in FIG. 3.

Figure 3:
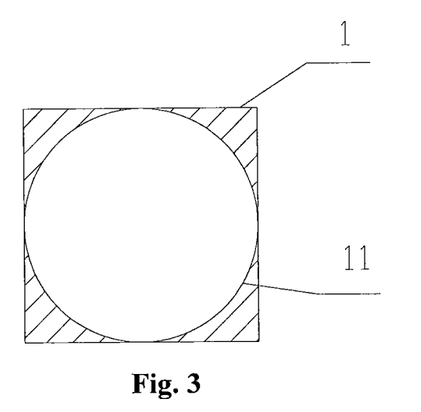
FIG. 3 is a schematic view of an arrangement location of a cylindrical main body part according to the present invention.

Obviously, the cross section of the frame 1 is a square frame having a certain thickness, the inscribed circle 11 is a circular boundary, and the cross section of the cylindrical main body part 2 is an annular arc with a certain thickness.

Figure 4:
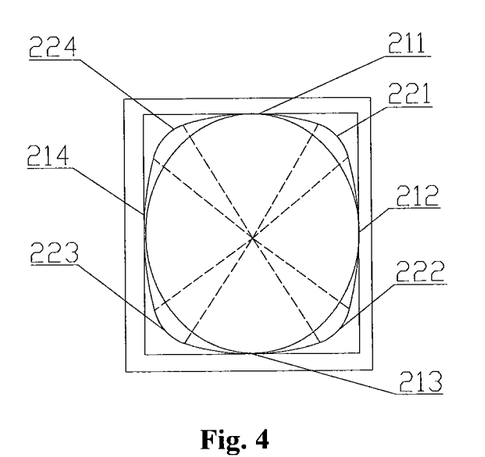
FIG. 4 is a structural schematic view of a cross section of the cylindrical main body part according to the present invention.

Referring to FIGS. 3 and 4, FIG. 3 is a schematic view of an arrangement location of a cylindrical main body part according to the present invention; and FIG. 4 is a structural schematic view of a cross section of the cylindrical main body part according to the present invention.

Specifically, the cross section of the cylindrical main body part 2 may be formed by smoothly connecting eight arcs. The eight arcs may further include four first arcs having relatively large diameter and four second arcs having relatively small diameter, with the first arcs and the second arcs being arranged alternately with each other. Specifically, chords of an upper first arc 211 and a lower first arc 213 each are arranged horizontally, chords of a right first arc 212 and a left first arc 214 each are arranged vertically; an upper right second arc 221 is arranged between the upper first arc 211 and the right first arc 212, and connects the upper first arcs 211 with the right first arc 212 smoothly; a lower right second arc 222 is arranged between the right first arc 212 and the lower first arc 213, and connects the right first arc 212 with the lower first arc 213 smoothly; a lower left second arc 223 is arranged between the lower first arc 213 and the left first arc 214, and connects the lower first arc 213 with the left first arc 214 smoothly; and an upper left second arc 224 is arranged between the left first arc 214 and the upper first arc 211, and connects the left first arc 214 with the upper first arc 211 smoothly.

In this way, the cylindrical main body part having a relatively smooth surface is obtained by using the second arcs with relatively small diameter to connect individual first arcs with relatively large diameter, so that the stress concentration generated from internal and external loads is avoided, and the load-carrying ability of the tank body of the container is further improved. Furthermore, it is relatively easy to form a smooth arc during the manufacturing, so that the manufacturing procedure is simplified.

The cross section of the above cylindrical main body part may further be formed by smoothly connecting curves other than the arcs, for example by parabolas and arcs smoothly connecting individual parabolas.

In the above specific embodiment, since the cylindrical main body part is formed by continuously bending an integral piece of sheet material and then by welding in only one procedure, so that the cylindrical main body part has only one welding seam, the risk of leakage of the tank body of the container in use is reduced significantly, and the reliability of the tank body of the container in working is improved. Furthermore, the cylindrical main body part is formed by smoothly connecting a plurality of arc-shaped surfaces, so that the boundary of the external frame is fully utilized, and the volume of the tank body is ensured. Moreover, compared with the cross section formed by assembling several steel plates, the force condition of the arc-shaped cross section is better substantially, and the load-carrying ability of the cylindrical main body part itself is improved, so that the number of the strengthening member required may be reduced, thereby the dead weight of the tank body of the container is reduced and the load-carrying ability of the tank body of the container is effectively improved.

The above tank body of the container may be further improved.

Figure 5:
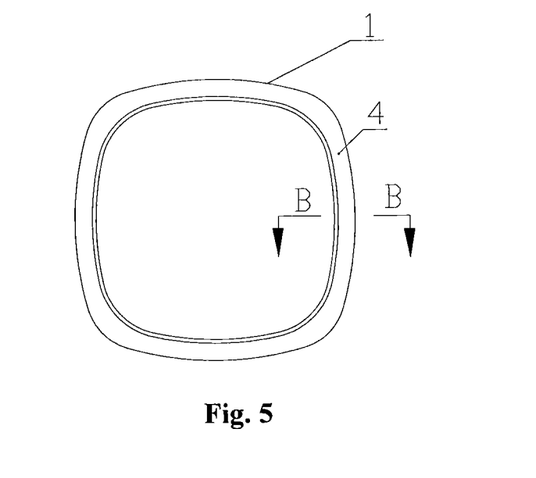
FIG. 5 is a structural schematic view of a tank body strengthening device according to the present invention.
Figure 6:
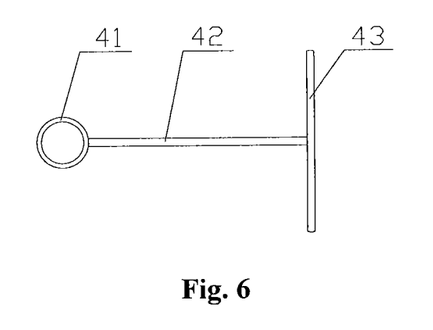
FIG. 6 is a schematic sectional view taken in B-B direction of the tank body strengthening device shown in FIG. 5.

Referring to FIGS. 5 and 6, FIG. 5 is a structural schematic view of a tank body strengthening device according to the present invention; and FIG. 6 is a schematic sectional view taken in B-B direction of the tank body strengthening device shown in FIG. 5.

In another specific embodiment, the tank body strengthening device 4 may be a strengthening ring fitted and fixed with the cylindrical main body part, and the shape of the tank strengthening device 4 may be matched with the shape of the cylindrical main body part or may be a ring that is easier to be manufactured. Thereby, it is not necessary for the internal strengthening ring to occupy the external space of the tank body of the container, and the volume of the tank body is further prevented from being reduced.

The number of the strengthening ring 4 provided may be one or more, so as to obtain a better strengthening effect.

The plurality of strengthening rings 4 may be arranged inside the cylindrical main body part along an axial direction of the cylindrical main body part, with the axes of the strengthening ring 4 and the cylindrical main body part being parallel substantially. In this way, the plurality of strengthening rings arranged along the axial direction of the cylindrical main body part may carry the internal and external loads more effectively, and thus the load-carrying ability of the tank body is further improved.

Indeed, the load-carrying ability of the tank body of the container may be further improved by means of a combination of the tank body strengthening device and an external strengthening ring according to the present invention.

The inner strengthening ring 4 may substantially be of "I" shape in cross section, i.e., the structure of the strengthening ring 4 may include three parts: an external ring 43, a middle part 42 and an internal ring 41, and the widths of the internal ring 41 and the external ring 43 each are greater than that of the middle part 42. The external ring 45 is fixedly connected to the inner wall of the cylindrical main body part, specifically by welding. The external ring 43 may be manufactured to be cylindrical, and the thickness of the external ring 43 may be relatively thin. The middle part 42 is arranged at the inner side of the external ring 43, and may be a ring-shaped strengthening plate perpendicular to the external ring 43, and may have a thickness greater than that of the external ring 43. The internal ring 41 is arranged at the inner side of the middle part 42, and may become a flat plate or an internal strengthening component that is ring-shaped or circular in cross section.

This structure of the above strengthening ring can bear heavier loads and requires less material and space, so that this tank body of the container may better resist against the internal and external pressure and take up relatively small space. Thus, the effective volume of the tank body is ensured and the dead weight of the tank body of the container is further reduced.

The strengthening ring 4 is not limited to be of a "I" shape, but it may also be of other structures that can play a role in strengthening, such as "T" shape. The material of the strengthening ring 4 may be metal which has enough stiffness and strength and is commonly used in mechanical field, such as cast ion or stainless steel.

Figure 7:
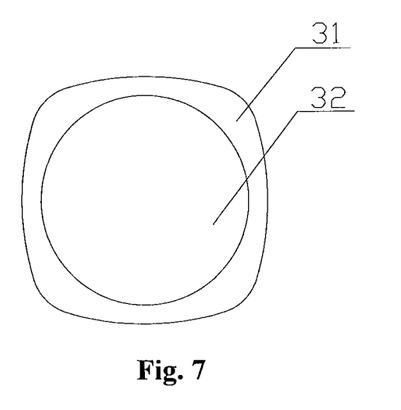
FIG. 7 is a structural schematic view of an end enclosure according to the present invention.
Figure 8:
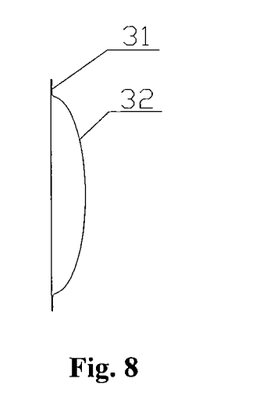
FIG. 8 is a schematic side view of the end enclosure shown in FIG. 7.

Referring to FIGS. 7 and 8, FIG. 7 is a structural schematic view of an end enclosure according to the present invention; and FIG. 8 is a schematic side view of the end enclosure shown in FIG. 7.

In yet another specific embodiment, the end enclosure 3 according to the present invention may further include a connecting plate 31 and a projection part 32. The connecting plate 31 may be of the same shape as the cylindrical main body part 2, and the projection part 32 is formed in the middle of the connecting plate 31 by stamping. In this way, the end enclosure 3 may be connected well to the cylindrical main body part 2, and the projection part 32 may be substantially of an ellipsoid shape, a dish shape or a spherical crown shape, so as to bear the internal and external pressure better and improve the load-carrying ability of the tank body of the container.

The above projection part may be a part of the connecting plate and may be formed by stamping the connecting plate.

The end enclosure 3 may also be formed by integrally stamping with a combined cross section, for example, the external cross section of the end enclosure 3 is of an ellipsoid shape, and the internal cross section of the end enclosure 3 has the same shape as the cross section of the cylindrical main body part. In this way, the external ellipsoid-shape cross section has a better force-bearing ability and may bear relatively heavy external and internal loads, while the internal cross section may be connected effectively with the cylindrical main body part.

Besides the above tank body of the container, the present invention further provides a tank container including the above tank body of the container, and as to the structures of other parts of the tank container, reference is made to the prior art, which will not be described in detail herein.

Figure 9:
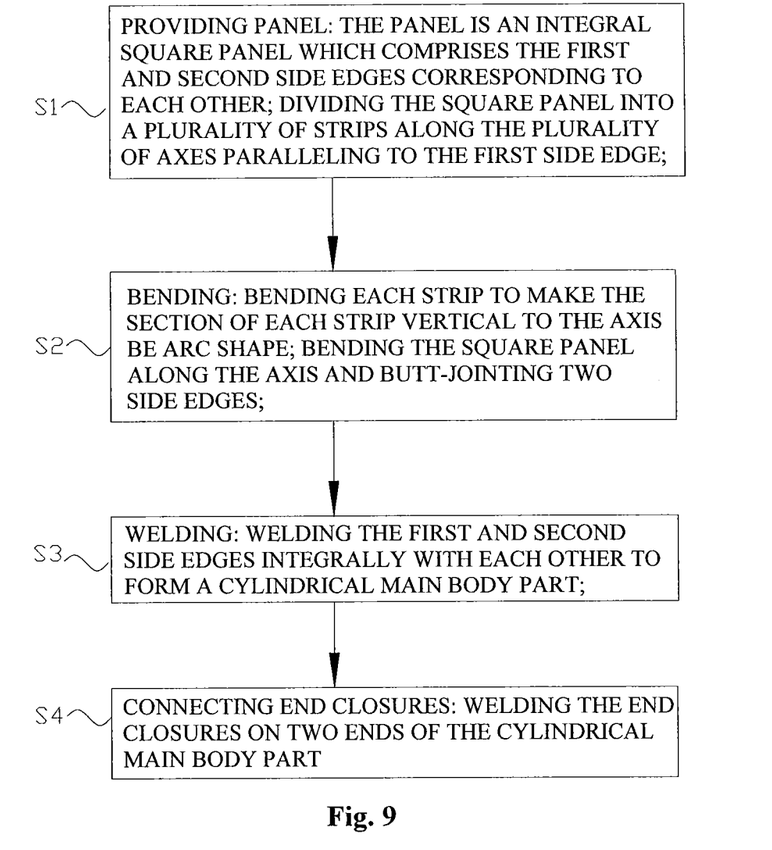
FIG. 9 is a flow chart of a specific embodiment of a method for manufacturing a tank body of a container according to the present invention.

Referring to FIG. 9, FIG. 9 is a flow chart of a specific embodiment of a method for manufacturing a tank body of a container according to the present invention.

In one specific embodiment, the tank body manufactured by using the method for manufacturing the tank body of the container according to the present invention is arranged inside a frame that is square in cross section, and the cross section of the cylindrical main body part of the tank body is located substantially between a square cross section of the frame and an inscribed circle of the square cross section. The method may include the following steps in sequence.

Step S1: providing a sheet material, i.e.,
providing an integral piece of square sheet material which has a first side edge and a second side edge opposite to the first side edge; and dividing the square sheet material into several strip-shaped sheets along its axis. It should be noted that, the dividing into several strip-shaped sheets is not cut in an actual sense, but only means that the square sheet material is divided notionally into several parts, so as to better understand the technical solutions of the present invention.

Step S2: bending, i.e.,
bending the strip-shaped sheets respectively around respective axes, so that individual strip-shaped sheets are arc in a cross section perpendicular to the axial direction; folding the square sheet material along its axis, and connecting the first side edge and the second side edge. The process of bending the strip-shaped sheets and the process of folding the square sheet material may be performed in a reverse order, and may be implemented by rolling.

Step S3: welding, i.e.,
welding the first side edge and the second side edge, which face to each other after bending and folding, into an integral piece to form the cylindrical main body part. The step of welding may be performed in a conventional manner in the art.

Step S4: connecting with end enclosures, i.e.,
welding the end enclosures at both ends of the cylindrical main body part respectively. This step may be performed by a conventional welding which can ensure the reliability of the connection.

In the method for manufacturing the tank body of the container according to the present invention, the integral piece of square sheet material is bended, so that the sheet material has an arc-shaped cross section, and the first side edge and the second edge which are opposed to each other are weld to form a cylindrical main body part, that is, only one welding procedure is required to form the cylindrical main body part, so that the risk of leakage in use is reduced, and the reliability of the tank body of the container in working is improved. Moreover, since the integral piece of square sheet material is bended into an arc shape, the load-carrying ability of the cylindrical main body part itself is improved, so that the number of the strengthening member required may be reduced, thereby the dead weight of the tank body of the container is reduced and the load-carrying ability of the tank body of the container is effectively improved.

The above are the detailed description of the tank container, the tank body thereof and the method for manufacturing the tank body according to the present invention. The principles and the embodiments of the present invention are described herein in conjunction with specific examples, and the descriptions made to the above embodiments are only used to facilitate the understanding of the method and the spirit of the present invention. It is to be noted that, many improvements and modifications may be made by those skilled in the art without deviating from the principle of the present invention, and these improvements and modifications also fall into the protection scope of the present invention.

What is claimed is:

1. A tank body of a container arranged inside a frame with a square cross section comprising:
   a cylindrical main body part;
   end enclosures arranged at both ends of the cylindrical main body part and fixedly connected with the cylindrical main body part; and
   a tank body strengthening device, wherein the cylindrical main body part comprises a plurality of surfaces having arc-shaped cross sections, the cylindrical main body part formed by one piece of square sheet material, wherein a cross section of the cylindrical main body part of the tank body is located substantially between the square cross section of the frame and an inscribed circle of the square cross section; and
   the tank body strengthening device comprises a plurality of strengthening rings fitted and fixed with the cylindrical main body part, each of the strengthening rings arranged inside the cylindrical main body part, a cross section of each of the strengthening ring is substantially a "I" shape, and wherein each of the strengthening rings comprises an external ring, a middle part and an internal ring, the external ring cylindrically configured and coaxial with the cylindrical main body part, the external ring fixedly connected to the cylindrical main body part, the middle part comprises an annular strengthening plate perpendicular to the external ring, and the internal ring comprises an internal strengthening member having a circular or a ring-shaped cross section and fixedly connected to the inner side of the annular strengthening plate.

2. The tank body of the container according to claim 1, wherein the cross section of the cylindrical main body part comprises four first arcs having relatively large diameter, and four second arcs having relatively small diameter, wherein the second arcs are arranged alternately with the first arcs.

3. The tank body of the container according to claim 2, wherein each of the end enclosures further comprises a connecting plate and a projection part, the connecting plate adapted to the cross section of the cylindrical main body part in shape, and the projection part located in the middle of the connecting plate.

4. The tank body of the container according to claim 1, wherein each of the end enclosures further comprises a connecting plate and a projection part, the connecting plate adapted to the cross section of the cylindrical main body part in shape, and the projection part located in the middle of the connecting plate.

5. A tank container, comprising a tank body, the tank body arranged inside a frame with a square cross section and comprising:
   a cylindrical main body part;
   end enclosures arranged at both ends of the cylindrical main body part and fixedly connected with the cylindrical main body part;
   a tank body strengthening device, wherein the cylindrical main body part comprises a plurality of surfaces having arc-shaped cross sections, and the cylindrical main body part is formed by one piece of square sheet material, a cross section of the cylindrical main body part of the tank body is located substantially between the square cross section of the frame and an inscribed circle of the square cross section; and
   the tank body strengthening device further comprises a plurality of strengthening rings fitted and fixed with the cylindrical main body part, each of the strengthening rings is arranged inside the cylindrical main body part, and a cross section of each of the strengthening ring is substantially an "I" shape, each of the strengthening rings comprises an external ring, a middle part and an internal ring, the external ring is cylindrically configured and is coaxial with the cylindrical main body part, the external ring fixedly connected with the cylindrical main body part the middle part an annular strengthening plate perpendicular to the external ring, and the internal ring an internal strengthening member having a circular or a ring-shaped cross section and fixedly connected to the inner side of the annular strengthening plate.

6. The tank container according to claim 5, wherein the cross section of the cylindrical main body part comprises four first arcs having relatively large diameter, and four second arcs having relatively small diameter, the second arcs arranged alternately with the first arcs.

7. The tank container according to claim 5, wherein each of the end enclosures further comprises a connecting plate and a projection part, the connecting plate adapted to the cross section of the cylindrical main body part in shape, and the projection part located in the middle of the connecting plate.

* * * * *